US010902256B2

(12) United States Patent
Madabhushi et al.

(10) Patent No.: US 10,902,256 B2
(45) Date of Patent: Jan. 26, 2021

(54) PREDICTING RESPONSE TO IMMUNOTHERAPY USING COMPUTER EXTRACTED FEATURES RELATING TO SPATIAL ARRANGEMENT OF TUMOR INFILTRATING LYMPHOCYTES IN NON-SMALL CELL LUNG CANCER

(71) Applicant: Case Western Reserve University, Cleveland, OH (US)

(72) Inventors: Anant Madabhushi, Shaker Heights, OH (US); Xiangxue Wang, Cleveland Heights, OH (US); Cristian Barrera, Cleveland, OH (US); Vamsidhar Velcheti, Pepper Pike, OH (US)

(73) Assignee: Case Western Reserve University, Cleveland, OH (US)

( * ) Notice: Subject to any disclaimer, the term of this patent is extended or adjusted under 35 U.S.C. 154(b) by 160 days.

(21) Appl. No.: 16/277,021

(22) Filed: Feb. 15, 2019

(65) Prior Publication Data
US 2019/0258855 A1 Aug. 22, 2019

Related U.S. Application Data

(60) Provisional application No. 62/633,442, filed on Feb. 21, 2018.

(51) Int. Cl.
*G06K 9/00* (2006.01)
*G06T 7/00* (2017.01)
(Continued)

(52) U.S. Cl.
CPC ..... *G06K 9/00536* (2013.01); *G06K 9/00523* (2013.01); *G06K 9/6272* (2013.01);
(Continued)

(58) Field of Classification Search
CPC .......... G06K 9/00536; G06K 9/00523; G06K 9/6277; G06K 9/6272; G06K 9/6228;
(Continued)

(56) References Cited

U.S. PATENT DOCUMENTS

2017/0103521 A1* 4/2017 Chukka ................ G06T 7/0012
2017/0365053 A1* 12/2017 Yuan .................... G06T 7/0012
2018/0107786 A1* 4/2018 Morrison .......... G01N 33/57484

* cited by examiner

*Primary Examiner* — Brandon J Miller
(74) *Attorney, Agent, or Firm* — Eschweiler & Potashnik, LLC

(57) ABSTRACT

Embodiments include controlling a processor to perform operations, the operations comprising: accessing a digitized image of a region of tissue demonstrating non-small cell lung cancer (NSCLC), detecting a member of a plurality of cellular nuclei represented in the image; classifying the member of the plurality of cellular nuclei as a tumor infiltrating lymphocyte (TIL) nucleus or non-TIL nucleus; extracting spatial TIL features from the plurality of cellular nuclei, including a first subset of features based on the spatial arrangement of TIL nuclei, and a second, different subset of features based on the spatial relationship between TIL nuclei and non-TIL nuclei; generating a set of graph interplay features based on the set of spatial TIL features; providing the set of graph interplay features to a machine learning classifier; receiving, from the machine learning classifier, a probability that the region of tissue will respond to immunotherapy, based, at least in part, on the set of graph interplay features; classifying the region of tissue as likely to respond to immunotherapy or unlikely to respond to immunotherapy based, at least in part, on the probability; and displaying the classification.

20 Claims, 12 Drawing Sheets

(51) Int. Cl.
*G06K 9/62* (2006.01)
*G06N 20/20* (2019.01)

(52) U.S. Cl.
CPC ........... *G06K 9/6277* (2013.01); *G06N 20/20* (2019.01); *G06T 7/0012* (2013.01); *G06T 2207/30096* (2013.01)

(58) Field of Classification Search
CPC .............. G06K 2209/05; G06T 7/0012; G06T 2207/30096; G06T 2207/30024; G06T 2207/30068; G06N 20/20; G06N 5/003; G06N 7/005
See application file for complete search history.

PREDICTING RESPONSE TO IMMUNOTHERAPY USING COMPUTER EXTRACTED FEATURES RELATING TO SPATIAL ARRANGEMENT OF TUMOR INFILTRATING LYMPHOCYTES IN NON-SMALL CELL LUNG CANCER

CROSS REFERENCE TO RELATED APPLICATIONS

This application claims the benefit of U.S. Provisional Application 62/633,442 filed Feb. 21, 2018, which is incorporated by reference herein in its entirety.

FEDERAL FUNDING NOTICE

This invention was made with government support under grants 1U24CA199374-01, R01CA202752-01A1, R01CA208236-01A1, R01CA216579-01A1, and R01CA220581-01A1, awarded by the National Institutes of Health. Also grants C06RR12463-01, and W81XWH-16-1-0329, awarded by the Department of Defense. The government has certain rights in the invention.

BACKGROUND

Immune checkpoint inhibitors are used as second-line therapy or as part of a combined therapy for advanced stage non-small cell lung cancer (NSCLC). Drugs that target the programmed cell death protein 1 (PD-1) receptor or its ligand, PD-L1, have been shown to decrease risk of progression by as much as 60% when compared to standard chemotherapeutic regimes. However, only about 20% of patients treated with such drugs that target the PD-1 receptor or its ligand, PD-L1, show significant benefit. The current gold standard for predicting response is increased tissue expression of PD-L1, but this measure is not optimal, due to spatial and temporal heterogeneity associated with PD-L1.

BRIEF DESCRIPTION OF THE DRAWINGS

The accompanying drawings, which are incorporated in and constitute a part of the specification, illustrate various example operations, apparatus, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that, in some examples, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
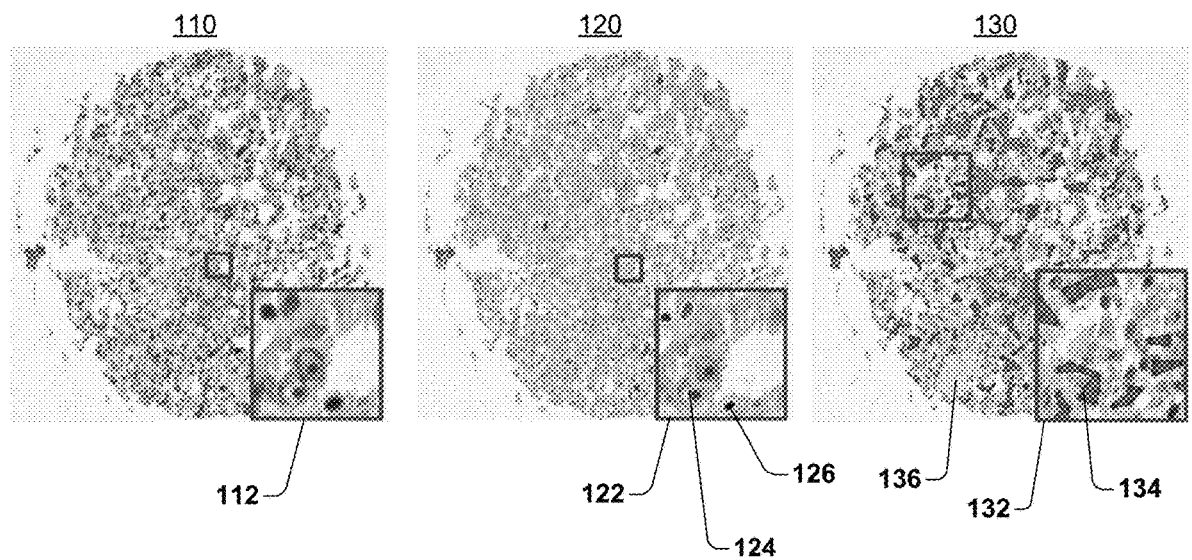
FIG. 1 illustrates representative tissue micro array (TMA) tissue spots of recurrent early-stage NSCLC.

Tumor-infiltrating lymphocytes (TILs) are correlated with PD-L1 levels. TILs are also correlated with antigen-induced anti-tumor immune pressure. Increased TILs are associated with treatment response and longer survival. The spatial arrangement of TILs may be prognostic of outcome in different cancer types, including NSCLC.

Embodiments employ computer-extracted features that quantify the spatial arrangement of TILs on digitized hematoxylin and eosin (H&E) stained images to predict response to immunotherapy, including but not limited to Nivolumab, in NSCLC. Embodiments capture measurements relating to the arrangement of TIL clusters represented in the H&E stained imagery. Embodiments may determine the set of features that are most discriminative in distinguishing responders from non-responders, and may train a machine learning classifier using the set of features.

In one embodiment, a first dataset of digitized H&E stained imagery acquired of fifty-six (56) NSCLC patients with tumor biopsies who were treated with Nivolumab was accessed. Responders and non-responders were classified according to the RECIST criteria, or according to which patients demonstrated symptomatic improvement after two cycles of checkpoint inhibitor therapy. While this example describes Nivolumab immunotherapy, embodiments may predict response to other types of immunotherapy, including but not limited to pembrolizumab or atezolizumab. Tumor regions represented in the digitized H&E stained imagery were delineated. Embodiments identify TILs within the tumor regions and then define TIL clusters based on the proximity of TILs. Embodiments employ a network graph approach to capture measurements relating to the arrangement of the defined TIL clusters. In this embodiment, the top five most discriminative features are selected using a minimum redundancy, maximum relevance (mRMR) statistical feature selection method. In another embodiment, other feature selection approaches may be employed. In this embodiment, the top five most discriminative features include an area of TIL clusters feature, a spatial proximity of TILs to each other feature, a spatial proximity of TILs to tumor cells feature, and a density of clusters feature.

In another embodiment, a second dataset of digitized H&E stained imagery from eighty-two (82) NSCLC patients with tumor biopsies who were treated with Nivolumab, was accessed. The second dataset includes imagery acquired of patients across two different institutions. Responders and non-responders were classified according to the RECIST criteria. In this embodiment, the top five most discriminative features were selected using an mRMR approach. In this embodiment, the top five most discriminative features for predicting response to Nivolumab include graph-interplay features. In this embodiment, the top five most discriminative features include a weighted efficiency between two graphs feature, a similarity between two graphs feature, a nodes closeness ratio feature, a mean number of lymphocyte clusters in cancer cluster feature, and a difference of characteristic path length between two graphs feature.

The weighted efficiency between two graphs feature quantifies the efficiency between pair-wise nodes within a graph. The node efficiency is inversely proportional to distance. The similarity between two graphs feature quantifies the similarity between vertices and links between two graphs. The nodes closeness ratio feature quantifies the overall distance between pair-wise nodes in two graphs. In one embodiment, for each node in a nuclei graph, we find the closest node in a lymphocyte graph, and quantify the overall distance between pair-wise nodes in the two graphs. The mean number of lymphocyte clusters in cancer cluster feature is computed by, for each cancer cell's constructed cluster, determining the number of lymphocyte clusters within the cancer cell's constructed cluster, and then computing the mean for the entire image. The difference of characteristic path length (CPL) between two graphs feature quantifies the CPL difference between a cancer cell graph and a lymphocyte graph. The CPL is the averaged shortest length between each pair-wise node. Higher CPL implies that the shape of the graph tends to a linear chain, while lower CPL indicates a more compact graph.

Figure 3:
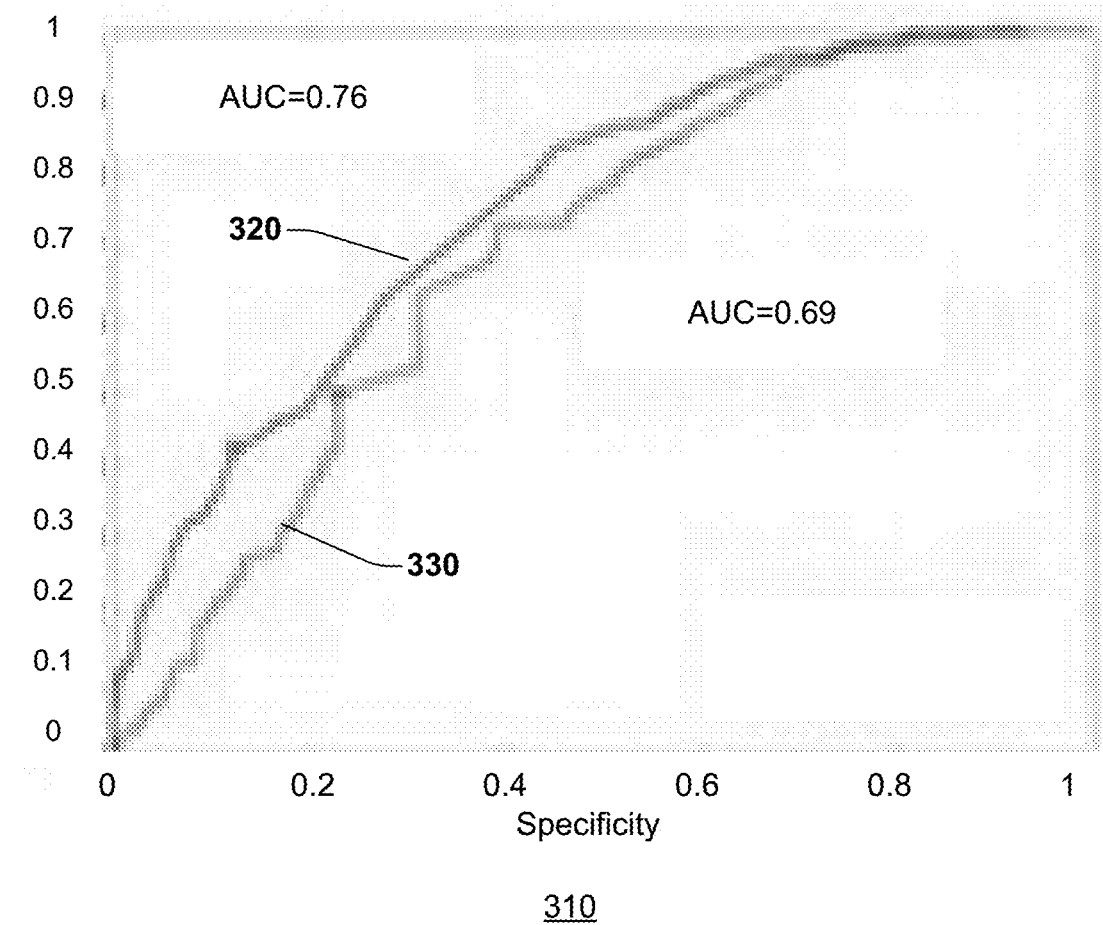
FIG. 3 illustrates an area under the curve (AUC) graph for predicting response to immunotherapy according to embodiments.

Embodiments may train a machine learning classifier using the extracted discriminative features to classify a region of tissue demonstrating NSCLC as a responder to immunotherapy or non-responder to immunotherapy. Immunotherapy may include, for example, Nivolumab, pembrolizumab, ateziolizumab, or other type of immunotherapy agent. In one embodiment, a random forest classifier is trained using a training subset of the second dataset of digitized H&E stained imagery acquired of eighty-two (82) NSCLC patients acquired across two different institutions. In this embodiment, the training subset includes imagery from thirty-two (32) subjects from the first of the two different institutions. In this embodiment, the random forest classifier is tested using a testing subset of the second dataset, the testing subset including imagery from fifty (50) subjects from the second of the two different institutions. In this embodiment, a region of tissue is classified as a responder or non-responder with an area under the curve (AUC) of at least 0.76. FIG. 3 illustrates a graph 310 of the area under the receiver operating characteristic (ROC) curves of this embodiment. The ROC curve for embodiments on the training subset is illustrated at 320, and the ROC curve for embodiments on the testing subset is illustrated at 330.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, circuit, processor, or similar electronic device that manipulates and transforms data represented as physical (electronic) quantities.

Example methods and operations may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Example embodiments generate cluster graphs of TIL nuclei and cluster graphs of non-TIL nuclei, and extract spatial TIL (SpaTIL) features relating to: 1) the spatial architecture of TIL clusters, 2) co-localization of clusters of both TILs and non-TIL cancer nuclei, and 3) variation in density of TIL clusters across the tissue slide image, based on the cluster graphs. Embodiments predict response to immunotherapy, including but not limited to Nivolumab, pembrolizumab, ateziolizumab, or other type of immunotherapy agent, based, at least in part, on the association between response and the SpaTIL features on patients with early stage (e.g., stage I and stage II) NSCLC. Embodiments predict response to immunotherapy, including but not limited to Nivolumab, pembrolizumab, ateziolizumab, or other type of immunotherapy agent, using SpaTIL features in patients with NSCLC with significantly greater accuracy and repeatability than the manual estimation of degree of TILs by thoracic pathologists, or by existing approaches that merely count TILs or attempt to grade TILs. Embodiments thus provide the technical effect of providing improved accuracy in systems, apparatus, processors, computers, or other implementations that predict response to immunotherapy, including but not limited to Nivolumab, pembrolizumab, ateziolizumab, or other type of immunotherapy agent, in H&E stained images of tissue demonstrating cancerous pathology.

Embodiments automatically identify TILs and non-TIL nuclei in digitized H&E imagery. First, the spatial location of TILs and non-TIL nuclei on digitized H&E images is identified. In one embodiment, a watershed-based technique is used for automatically detecting the nuclei. This technique applies a set of mathematical operations, including fast radial symmetry transform and regional minima, at different scales (e.g., 5×, 10× and 20×) to identify candidate locations for nuclei. This technique improves on those employed by existing approaches to segmenting nuclei by being computationally simpler and faster. This technique also facilitates the adjustment and fine-tuning of parameters with greater simplicity than techniques used by existing approaches, thereby providing the technical effect of improving the performance of computers, systems, or other apparatus on which embodiments are implemented.

Once nuclei represented in a digitized H&E image are detected, embodiments distinguish lymphocytes (i.e., TILs)

from non-lymphocytes. TILs tend to be smaller compared to cancerous nuclei. TILs also tend to be more rounded and with a darker, more homogeneous staining than cancerous nuclei. Embodiments extract image derived features that relate to texture, shape, and color attributes of the segmented nuclei. These image derived features are provided to a machine learning classifier to classify the individual nuclei as corresponding either to TILs or non-TILs. The machine learning classifier may be, for example, a quadratic discriminant analysis (QDA) classifier, a linear discriminant analysis (LDA) classifier, a random forests classifier, or a convolutional neural network (CNN) classifier trained to distinguish TILs from non-TILs.

Embodiments quantitatively evaluate the spatial arrangement of TILs through the construction of spatial TIL graphs. A graph is a mathematical construct comprising of a finite sets of objects (nodes) that capture global and local relationships via pair-wise connections (edges) between the nodes. Graphs may be used to quantitatively characterize nuclear architecture in histopathological images by representing the nuclei as nodes and subsequently quantifying neighborhood relationships (e.g., proximity) and spatial arrangement between the nodes.

Embodiments identify sets of clusters of proximal TILs and non-TILs respectively to evaluate a spatial network of TILs and to extract the corresponding spatial TIL features. Embodiments represent centroids of each of, or a threshold number of, the individual TILs and non-TILs as nodes of a graph. Nodes are connected to others based on a weighted Euclidean norm where a weighting function favors connectivity between proximal nodes. This results in multiple disconnected subgraphs or clusters of TILs being generated. This process is also repeated separately for all the non-TILs, or a threshold number of the non-TILs, represented in the image. The threshold number of non-TILs, or the threshold number of the individual TILs and non-TILs as nodes of a graph, may be selected based on a desired level of predictive accuracy, or on a desired use of computational resources, or on other criteria.

Embodiments extract at least two separate sets of spatial TIL features from the image. The first set includes twenty features related to spatial arrangement of TILs, extracted from the TIL cluster graphs. These features include first-order statistics (e.g. mean, mode, median) of the following representative descriptors: number of lymphocytes within the clusters, ratio between the area of the TIL clusters and area of the TMA spot, or ratio between the numbers of TILs within the cluster and the cluster area. The second set includes sixty-five features describing the relationship between TIL and non-TIL clusters extracted for each image. These include the ratio between the density (ratio between the number of nuclei within the cluster and the cluster area) of a non-TIL cluster and the density of its closest neighbor TIL cluster, the intersecting areas of the TIL and non-TIL clusters, or a value indicating if the nearest neighbor of a TIL cluster is either a TIL or a non-TIL cluster.

Embodiments select the most discriminative features for distinguishing responders to immunotherapy from non-responders to immunotherapy, from among the two separate sets of spatial TIL features. In one embodiment, mRMR feature selection is employed to identify the spatial TIL features that most correlate with response. Selecting the spatial TIL features that most correlate with response to immunotherapy, including Nivolumab, also eliminates features which are grossly similar to each other to prevent redundancy. In one embodiment, the most discriminative features include graph interplay features, including an area of TIL cluster feature, a spatial proximity of TILs to each other feature, a spatial proximity of TILs to tumor cells feature, and a density of clusters feature. In another embodiment, the top five most discriminative features include graph interplay features including a weighted efficiency between two graphs feature, a similarity between two graphs feature, a nodes closeness ratio feature, a mean number of lymphocyte clusters in cancer cluster feature, and a difference of characteristic path length between two graphs feature. In some embodiments described herein, density may be defined as the ratio of the number of cells within a cluster to the cluster pixel area. In some embodiments described herein, betweenness centrality is a measure of centrality in a graph based on the shortest paths. In some embodiments described herein, closeness centrality is a measure of centrality calculated as the sum of the length of the shorted paths between a node and all other nodes in the graph.

Embodiments employ a machine learning classifier to compute a probability that the region of tissue will experience response to immunotherapy, including but not limited to Nivolumab. In one embodiment, a random forest classifier is trained using the top spatial TIL graph interplay features identified from the second dataset to separate the patients into two classes: response or non-response. Embodiments that employ a random forest classifier improve on existing approaches because in the context of predicting response using spatial TIL graph interplay features as described herein, random forest classifiers outperform other types of machine learning classifiers.

Additionally, a QDA classifier was trained using TIL-density-based (DenTIL) features on the same training set as embodiments for comparison with embodiments. The DenTIL features include a ratio between the number of TILs and the TMA spot area, a ratio between the total regions of the TMA spot covered by TILS to the total area of the corresponding TMA spot, a ratio between the number of TILs and the number of non-TILs within a TMA spot, and a grouping value indicating how close the TILs are to each other. The grouping value indicating how close the TILs are to each other is computed as the sum of the inverse distances between TILs.

Following parameter optimization (e.g., mRMR feature selection), the random forest classifier and the QDA-DenTIL classifier were locked down using the same training. The performance of the locked down random forest and QDA-DenTIL classifiers in distinguishing between early stage NSCLC patients who did and did not respond to immunotherapy was evaluated on the independent validation set that included the second subset of the second dataset. The random forest classifier and the QDA-DenTIL classifier assigned a probability of response to each image in the test sets. Classifier performance was evaluated via the concordance statistic or C-index. The response and non-response labels predicted by the random forest classifier and the QDA-DenTIL classifier were compared with the ground truth labels (true patient outcomes) to determine classifier accuracy and C-index. The C-index obtained for the random forest classifier and the QDA-DenTIL classifier were quantitatively compared with each other to evaluate the effect of spatial tissue sampling on the classifier performance.

Figure 4:
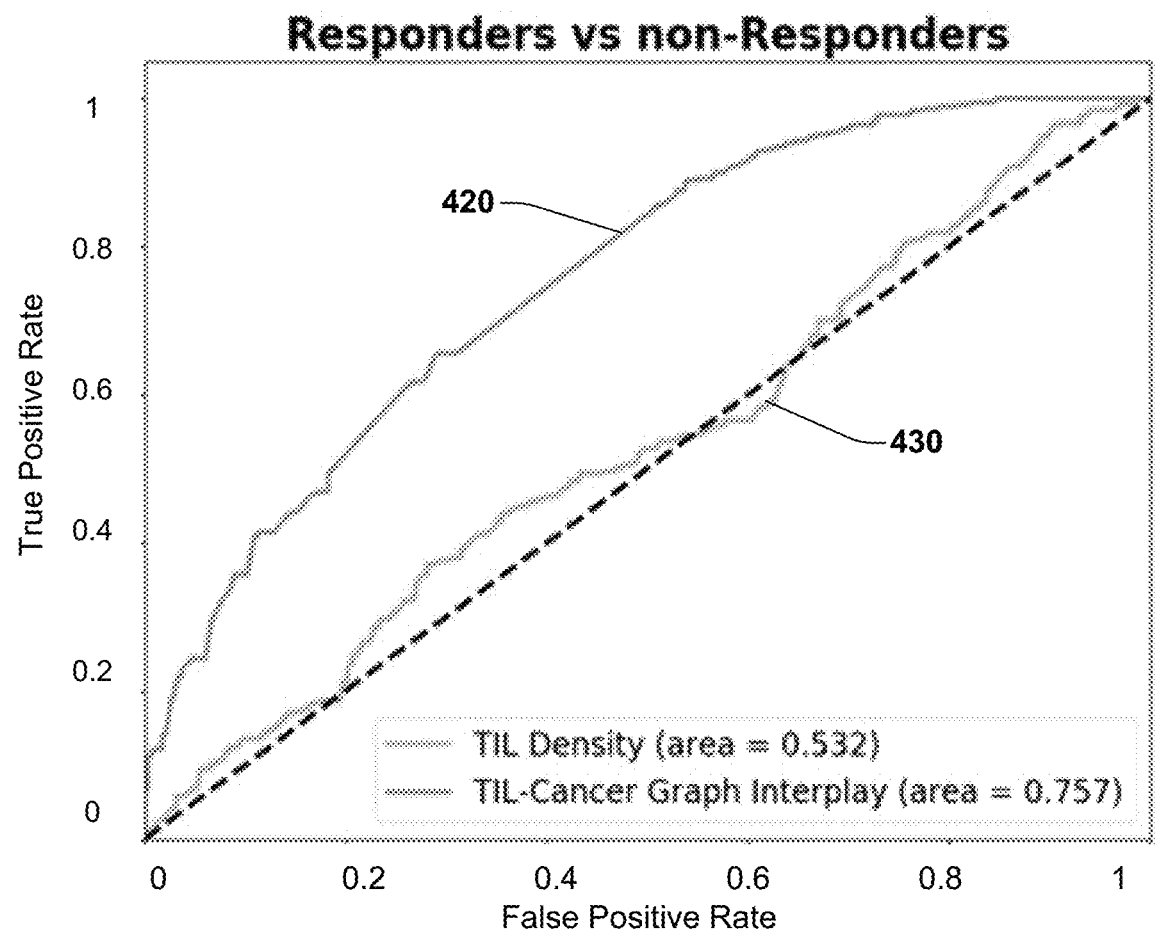
FIG. 4 illustrates AUC graphs for embodiments and existing approaches to predicting response to immunotherapy.

Embodiments measurably improve on existing approaches to predicting response to immunotherapy, including but not limited to Nivolumab, pembrolizumab, atezioliziumab, or other type of immunotherapy agent, in early stage NSCLC on digitized images of H&E tissue samples. On the training subset of thirty-two (32) subjects and the testing set of fifty (50) subjects, the random forest classifier using graph interplay features yielded AUCs of at least 0.69 and 0.76, respectively. FIG. 3 includes a graph 310 that illustrates an ROC curve 320 for the random forest classifier using graph interplay features on the training subset, and an ROC curve 330 on the testing subset. FIG. 4 includes a graph 410 that that illustrates an ROC curve 420 for the random forest classifier using graph interplay features on the testing subset, and an ROC curve 430 achieved by the QDA-DenTIL classifier on the same testing subset. Notably, the cohorts were obtained from different institutions with local and variable tissue processing and preservation protocols. In addition, slides were stained in different institutions and digitalized with two different instruments. This reflects the robustness, and the relative resilience to image and color variance on account of major pre-analytical variables and with samples from multiple different sites and institutions, of embodiments described herein.

Embodiments provide improved accuracy and speed compared to human pathologists. Human pathologists might preferentially focus on different areas of the tissue during examination (e.g., epithelium or stroma) or consider different cell populations within the "TIL" infiltration (e.g., mononuclear cells beyond lymphocytes such as plasmocytes and myeloid cells). Finally, different pathologists may have variable expertise evaluating immune cell infiltrates or natural individual variation in their perception of colors, shapes, and relative amounts/proportions. In contrast, the results obtained by embodiments described herein using spatial TIL features are objectively measured and indicate that the spatial arrangement of TILs and tumor cells is strongly associated with response to immunotherapy in early stage NSCLC ($p<0.05$).

FIG. 1 illustrates representative TMA spots of recurrent early-stage NSCLC. An original H&E stained image 110 is illustrated. A magnified section 112 of original H&E stained image 110 is also illustrated. At 120, the same region of tissue as illustrated by original H&E stained image 110 is illustrated with TIL nuclei 124 and non-TIL nuclei 126 illustrated in magnified section 122. At 130, the qualitative representation of a variation in the density of lymphocyte clusters spatial TIL feature is overlaid onto the same region of tissue as illustrated by original H&E stained image 110. A magnified section 132 includes a low density of lymphocyte clusters spatial TIL region 134. A high density of lymphocyte clusters spatial TIL region 136 is also illustrated.

Figure 2:
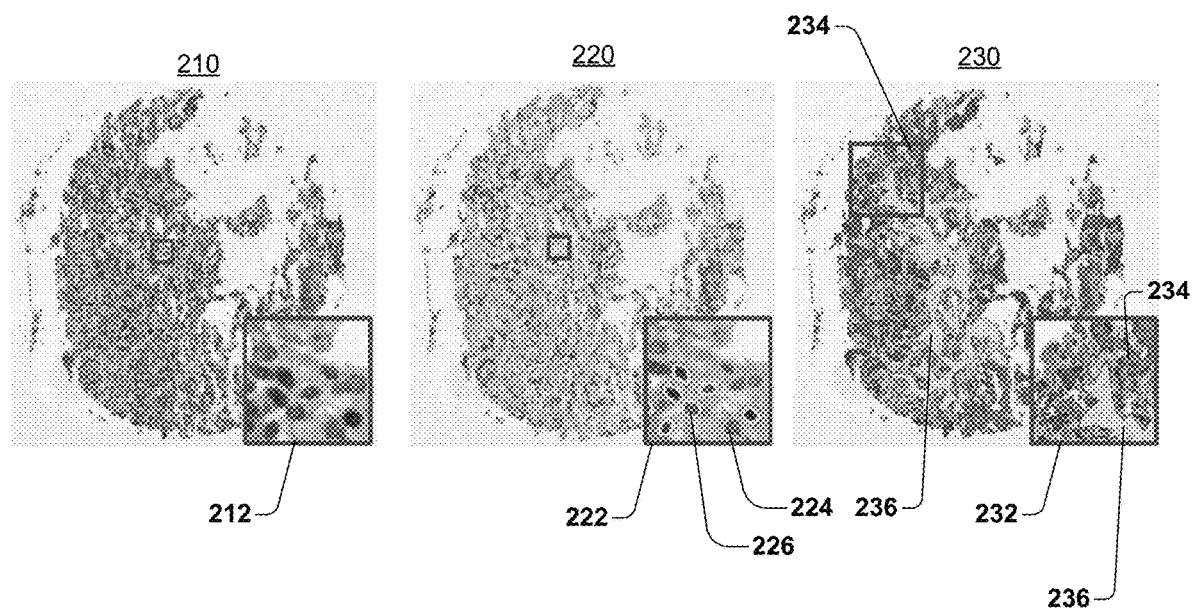
FIG. 2 illustrates representative TMA tissue spots of non-recurrent early-stage NSCLC.

FIG. 2 illustrates representative TMA spots of non-recurrent early-stage NSCLC. An original H&E stained image 210 is illustrated. A magnified section 212 of original H&E stained image 210 is further illustrated. At 220, the same region of tissue as illustrated by original H&E stained image 210 is illustrated with TIL nuclei 226 and non-TIL nuclei 224 illustrated in magnified section 222. At 230, the qualitative representation of a variation in the density of lymphocyte clusters spatial TIL feature is overlaid onto the same region of tissue as illustrated by original H&E stained image 210. A low density of lymphocyte clusters spatial TIL region 234 is illustrated. A high density of lymphocyte clusters spatial TIL region 236 is also illustrated. A magnified section 232 includes another low density of lymphocyte clusters spatial TIL region 234, and another high density of lymphocyte clusters spatial TIL region 236. Note that non-recurrence cases are characterized by the presence of more high-density clusters, while recurrence cases include a larger number of low-density clusters.

Figure 5:
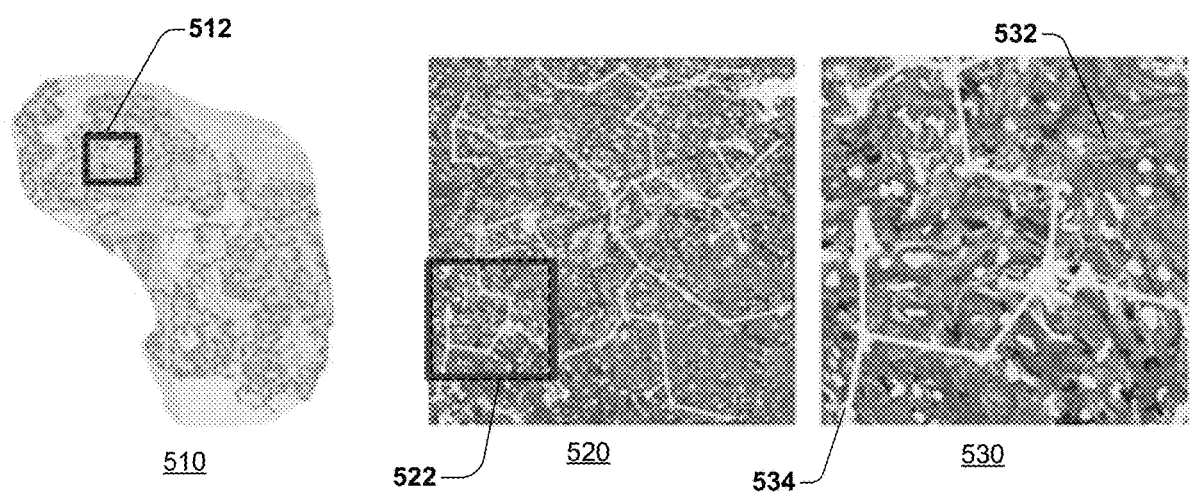
FIG. 5 illustrates representative TMA tissue spots of non-responder early-stage NSCLC.

FIG. 5 illustrates a representative TMA spot of early-stage NSCLC that did not respond to immunotherapy. An original H&E stained image 510 is illustrated. A section 512 of original H&E stained image 510 is indicated. The section 512 is illustrated in magnified form at 520, which includes spatial TIL graphs. A further section 522 is indicated. At 530, the section 522 is illustrated in magnified form with details of spatial TIL graphs in section 522, including a quantitative interplay feature map indicated at 532 and 534.

Figure 6:
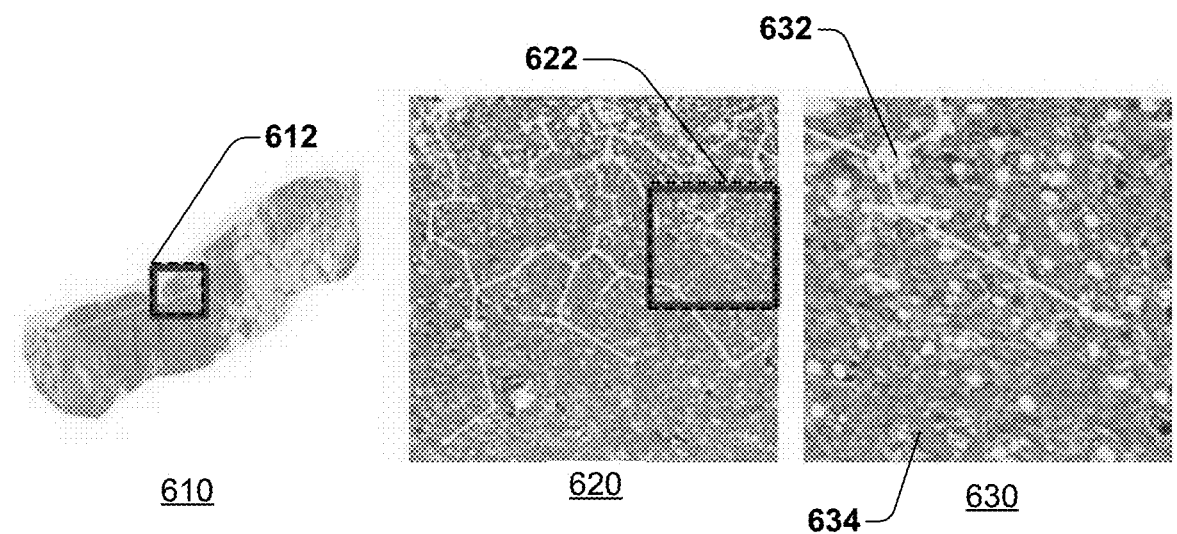
FIG. 6 illustrates representative TMA tissue spots of responder early-stage NSCLC.

FIG. 6 illustrates a representative TMA spot of early-stage NSCLC that responded to immunotherapy. An original H&E stained image 610 is illustrated. A section 612 of original H&E stained image 610 is indicated. The section 612 is illustrated in magnified form at 620, which includes spatial TIL graphs. A further section 622 is indicated. At 630, the section 622 is illustrated in magnified form with details of spatial TIL graphs in section 622, including a quantitative interplay feature map indicated at 632 and 634.

Figure 7:
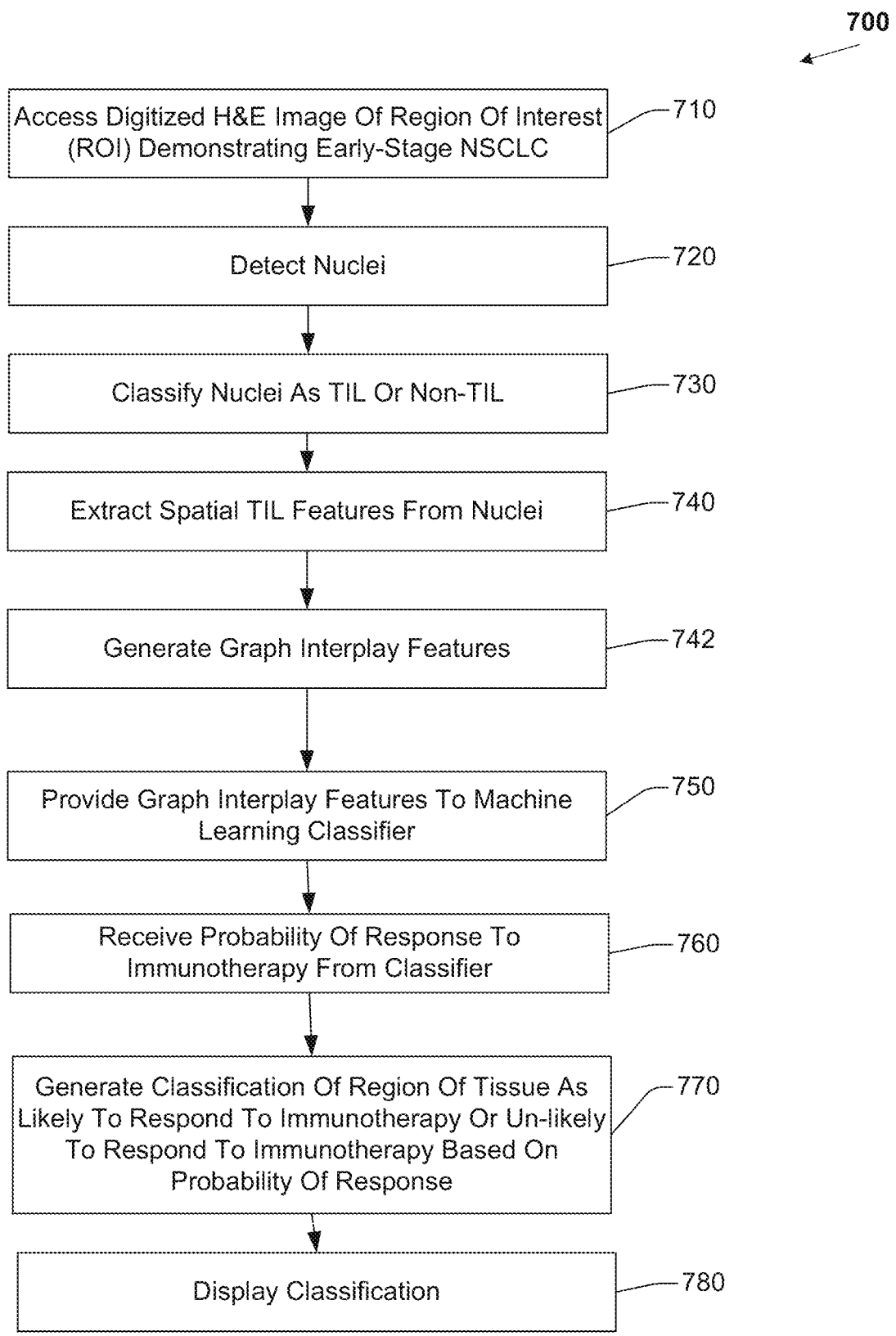
FIG. 7 illustrates a flow diagram of example operations for predicting response to immunotherapy.

FIG. 7 is a flow diagram of example operations 700 that may be performed by a processor for predicting response to immunotherapy, including but not limited to Nivolumab, pembrolizumab, atezioliuzmab, or other type of immunotherapy agent, in early stage NSCLC. A processor(s) may include any combination of general-purpose processors and dedicated processors (e.g., graphics processors, application processors, etc.). The processors may be coupled with or may include memory or storage and may be configured to execute instructions stored in the memory or storage to enable various apparatus, applications, or operating systems to perform the operations. The memory or storage devices may include main memory, disk storage, or any suitable combination thereof. The memory or storage devices may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

The set of operations 700 includes, at 710, accessing an image of a region of tissue. The region of tissue may include lung tissue. The image may be a digitized image of a region of tissue demonstrating early-stage NSCLC. The region of tissue includes a plurality of cellular nuclei, and the image includes a representation of the plurality of cellular nuclei. Accessing the image includes acquiring electronic data, reading from a computer file, receiving a computer file, reading from a computer memory, or other computerized activity not practically performed in the human mind. A member of the set of images has a plurality of pixels, a pixel having an intensity. In one embodiment, the image is a 1500 pixel by 1500 pixel digitized H&E stained image scanned at 20× magnification. In another embodiment, the image may be acquired using other, different imaging parameters, including different sizes, staining techniques, or scanning magnification levels.

The set of operations 700 also includes, at 720 detecting a member of the plurality of cellular nuclei represented in the image. In one embodiment, detecting a member of the plurality of cellular nuclei represented in the image includes detecting the member of the plurality of cellular nuclei represented in the image using a watershed segmentation technique. The watershed segmentation technique includes applying, at a plurality of scales, a fast radial symmetry transform and regional minima to the image. A scale may be, for example 5×, 10× or 20×. In another embodiment, another, different automated segmentation technique may be employed. For example, a deep learning based neural network may be employed to delineate the nuclei boundary based on a large number of training exemplars.

The set of operations 700 also includes, at 730, classifying the member of the plurality of cellular nuclei as a TIL nucleus or non-TIL nucleus. In one embodiment, classifying the member of the plurality of nuclei as a TIL nucleus or non-TIL nucleus includes extracting a set of image features from the member of the plurality of cellular nuclei. In this embodiment, the set of image features includes a texture feature, a shape feature, and a color feature. In another embodiment, the set of image features may include other, different features. Classifying the member of the plurality of nuclei as a TIL nucleus or non-TIL nucleus is based on the set of image features. Classifying the member of the plurality of nuclei as a TIL nucleus or non-TIL nucleus includes acquiring electronic data, reading from a computer file, receiving a computer file, reading from a computer memory, or other computerized activity.

The set of operations 700 also includes, at 740, extracting a set of spatial TIL features from the plurality of cellular nuclei. The set of spatial TIL features includes a first subset of features based on the spatial arrangement of TIL nuclei represented in the image. The set of spatial TIL features also includes a second subset of features based on the spatial relationship between TIL nuclei and non-TIL nuclei represented in the image.

In one embodiment, generating the first subset of features includes generating a TIL cluster graph. A node of the TIL cluster graph is a centroid of a TIL-nucleus. The probability that a first centroid of a first TIL-nucleus will be connected with a second, different centroid of a second, different TIL-nucleus is based on a weighted Euclidean norm of the Euclidean distance between the first centroid and the second centroid. Generating the first subset further includes computing a first set of spatial TIL features based on the TIL cluster graph.

In one embodiment, the first set of spatial TIL features includes the mean of the number of TILs in the TIL cluster graph, the mean of the ratio of the area of the TIL cluster graph and the area of the region of tissue represented in the image, and the mean of the ratio of the number of TILs within the TIL cluster graph and the area of the TIL cluster graph. In this embodiment, the first set of spatial TIL features also includes the mode of the number of TILs in the TIL cluster graph, the mode of the ratio of the area of the TIL cluster graph and the area of the region of tissue represented in the image, and the mode of the ratio of the number of TILs within the TIL cluster graph and the area of the TIL cluster graph. In this embodiment, the first set of spatial TIL features further includes the median of the number of TILs in the TIL cluster graph, the median of the ratio of the area of the TIL cluster graph and the area of the region of tissue represented in the image, and the median of the ratio of the number of TILs within the TIL cluster graph and the area of the TIL cluster graph. In another embodiment, the first set of spatial TIL features may include other, different features extracted from the TIL cluster graph.

In one embodiment, generating the second subset of features includes generating a non-TIL cluster graph. A node of the non-TIL cluster graph is a centroid of a non-TIL-nucleus. The probability that a first centroid of a first non-TIL nucleus will be connected with a second, different centroid of a second, different non-TIL nucleus is based on a weighted Euclidean norm of the Euclidean distance between the first non-TIL centroid and the second, different non-TIL centroid. Generating the second subset of features further includes computing a second set of spatial TIL features based on the non-TIL cluster graph and the TIL cluster graph, where the second set of spatial TIL features describes a statistical relationship between the non-TIL cluster graph and the TIL cluster graph.

In one embodiment, the second set of spatial TIL features includes a ratio between the density of a non-TIL cluster graph and the density of the TIL cluster graph nearest the non-TIL cluster graph. In this embodiment, the second set of spatial TIL features also includes the value of an intersecting area of a non-TIL cluster graph and a TIL cluster graph. In this embodiment, the second set of spatial TIL features further includes a value indicating if the nearest neighbor cluster graph of a TIL cluster graph is a non-TIL cluster graph or a TIL cluster graph. In another embodiment, the second set of spatial TIL features may include other, different features extracted from the non-TIL cluster graph, or from the spatial relationship of the non-TIL cluster graph with the TIL cluster graph.

The set of operations 700 also includes, at 742, generating a set of graph interplay features based on the set of spatial TIL features. The set of graph interplay may, in one embodiment, include five graph interplay features. In one embodiment, the set of graph interplay features includes: a weighted efficiency between two graphs feature; a similarity between two graphs feature; a nodes closeness ratio; a mean number of lymphocyte clusters in a cancer cluster feature; and a difference of characteristic path length between two graphs feature. In another embodiment, the set of graph interplay features includes an area of TIL clusters feature; a spatial proximity of TILs feature; a spatial proximity of TILs to non-TIL feature; and a density of clusters feature.

The set of operations 700 also includes, at 750, providing the set of graph interplay features to a machine learning classifier. Providing the set of graph interplay features to the machine learning classifier includes acquiring electronic data, reading from a computer file, receiving a computer file, reading from a computer memory, or other computerized activity not practicably performed in the human mind. In one embodiment, the machine learning classifier is a random forest classifier trained to distinguish tissue that will respond to immunotherapy from tissue that will not respond to immunotherapy. In another embodiment, the machine learning classifier is a support vector machine classifier, or QDA classifier. The machine learning classifier is trained on a set of training images. In one embodiment, a member of the set of training images is acquired using different imaging parameters than the digitized image. For example, the digitized image may be a 1500 pixel by 1500 pixel digitized H&E stained image scanned at 20× magnification, while the member of the training set of images may a 2000 pixel by 2000 pixel digitized H&E stained image scanned at 30× magnification. In other embodiments, other types of machine learning classifiers, or imaging parameters may be employed. In one embodiment, a first set of graph interplay features may be provided to a first type of machine learning classifier (e.g., random forest classifier). In another embodiment, a second, different set of graph interplay features may be provided to a second, different type of machine learning classifier (e.g., QDA classifier).

The set of operations 700 also includes, at 760, receiving, from the machine learning classifier, a probability that region of tissue will respond to immunotherapy. Immunotherapy may include Nivolumab, pembrolizumab, atezolizumab, or other type of immunotherapy agent. Receiving the probability from the machine learning classifier includes acquiring electronic data, reading from a computer file, receiving a computer file, reading from a computer memory, or other computerized activity not practically performed in the human mind. The machine learning classifier computes the probability based, at least in part, on the set of graph interplay features.

The set of operations 700 further includes, at 770, classifying the region of tissue as likely to respond to immunotherapy or unlikely to respond to immunotherapy. The classification of the region of tissue is based, at least in part, on the probability. The classification of the region of tissue may be further based on the image, or on the set of graph interplay features, or the set of spatial TIL features.

The set of operations 700 further include, at 780, displaying the classification. Displaying the classification may include displaying the classification on a computer monitor, a smartphone display, a tablet display, or other displays. Displaying the classification may also include printing the classification. Displaying the classification may also include controlling a NSCLC immunotherapy response prediction system, a computer assisted diagnosis (CADx) system, a monitor, or other display, to display operating parameters or characteristics of a machine learning classifier, during both training and testing, or during clinical operation of the machine learning classifier. By displaying the classification or operating parameters or characteristics of the machine learning classifier, example embodiments provide a timely and intuitive way for predicting response to immunotherapy in NSCLC, thus improving on existing approaches to predicting response to immunotherapy in NSCLC. Embodiments may further display the image, the set of graph interplay features, or the set of spatial TIL features.

Figure 8:
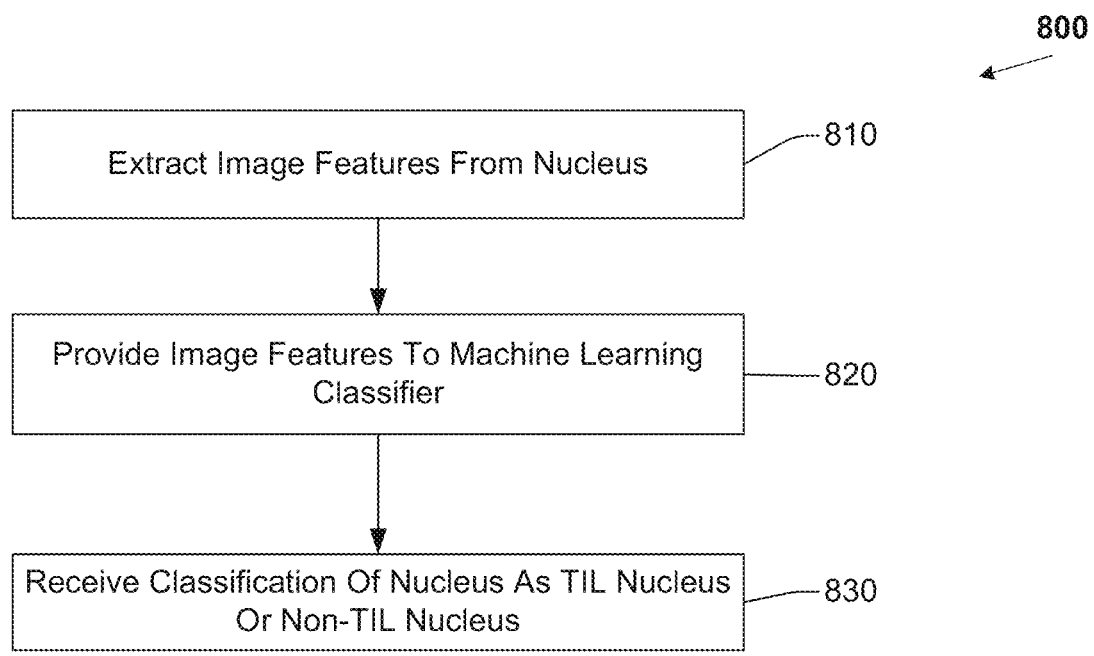
FIG. 8 illustrates a flow diagram of example operations for classifying a nucleus.

In one embodiment, classifying the member of the plurality of nuclei as a TIL nucleus or non-TIL nucleus also includes providing the set of image features to a second, different, machine learning classifier. FIG. 8 is a flow diagram of example operations 800, for classifying the member of the plurality of nuclei as a TIL nucleus or non-TIL nucleus. In this example, the set of operations 800 includes, at 810, extracting a set of image features from the member of the plurality of nuclei. In this embodiment, the set of image features includes a texture feature, a shape feature, and a color feature. In another embodiment, the set of image features may include other, different features. The set of operations also includes, at 820, providing the set of image features to a second machine learning classifier. The second machine learning classifier may be a QDA classifier, an LDA classifier, a random forests classifier, or may be a deep learning classifier, including a CNN. The set of operations further includes, at 830, receiving, from the second machine learning classifier, a classification of the member of the plurality of cellular nuclei as a TIL nucleus or non-TIL nucleus. The second machine learning classifier classifies the member of the plurality of cellular nuclei based on the set of image features. Classifying the member of the plurality of nuclei as a TIL nucleus or non-TIL nucleus includes acquiring electronic data, reading from a computer file, receiving a computer file, reading from a computer memory, or other computerized activity.

In one embodiment, the set of operations 700 further includes controlling a processor or a personalized NSCLC treatment plan system to generate a personalized treatment plan. The personalized treatment plan is based, at least in part, on the classification. In one embodiment, the personalized treatment plan is further based on the images, the set of graph interplay features, or the set of spatial TIL features. Generating a personalized treatment plan facilitates delivering a particular treatment that will be therapeutically active to the patient, while minimizing negative or adverse effects experienced by the patient. For example, the personalized treatment plan may suggest a surgical treatment, may define an immunotherapy agent, dosage, or schedule, or a chemotherapy agent dosage or schedule, when the region of tissue is classified as likely to respond to immunotherapy. An immunotherapy agent may be, for example, Nivolumab, pembrolizumab, atezolizumab, or other type of immunotherapy agent. For a region of tissue classified as unlikely to respond to immunotherapy, other treatments may be suggested.

In one embodiment, the operations 700 further include training the machine learning classifier. In this embodiment, the machine learning classifier is trained and tested using a training set of images and a testing set of images. The response status of the patients of which the members of the testing set and training set are acquired is known. Training the machine learning classifier may include training the machine learning classifier until a threshold level of accuracy is achieved, until a threshold time has been spent training the machine learning classifier, until a threshold amount of computational resources have been expended training the machine learning classifier, or until a user terminates training. Other training termination conditions may be employed. Training the machine learning classifier may also include determining which graph interplay features are most discriminative in distinguishing tissue likely to respond to immunotherapy from tissue unlikely to respond to immunotherapy, including but not limited to Nivolumab, pembrolizumab, atezolizumab, or other type of immunotherapy agent. Training the machine learning classifier may also include determining settings outside the classifier architecture but relevant to its learning behavior.

While FIGS. 7 and 8 illustrates various actions occurring in serial, it is to be appreciated that various actions illustrated in FIG. 7 or 8 could occur substantially in parallel. By way of illustration, a first process could involve detecting a member of the plurality of cellular nuclei, a second process could involve classifying a member of the plurality of cellular nuclei as a TIL or non-TIL nucleus, and a third process could involve extracting spatial TIL features. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage device may store computer executable instructions that if executed by a machine (e.g., computer, processor) cause the machine to perform methods or operations described or claimed herein including methods or operations 700 or 800. While executable instructions associated with the listed methods are described as being stored on a computer-readable storage device, it is to be appreciated that executable instructions associated with other example methods or operations described or claimed herein may also be stored on a computer-readable storage device. In different embodiments the example methods or operations described herein may be triggered in different ways. In one embodiment, a method or operation may be triggered manually by a user. In another example, a method or operation may be triggered automatically.

Improved classification of tissue demonstrating early-stage NSCLC may produce the technical effect of improving treatment efficacy by increasing the accuracy of and decreasing the time required to treat patients demonstrating early-stage NSCLC, or other forms of cancerous pathology. Treatments and resources, including expensive immunotherapy agents or chemotherapy may be more accurately tailored to patients with a likelihood of benefiting from said treatments and resources, including responding to immunotherapy or chemotherapy, so that more appropriate treatment protocols may be employed, and expensive resources are not wasted. Controlling a personalized medicine system, a CADx system, a processor, or NSCLC immunotherapy response prediction system based on improved, more accurate identification or classification of tissue further improves the operation of the system, processor, or apparatus, since the accuracy of the system, processor, or apparatus is increased and unnecessary operations will not be performed. Embodiments described herein, including at least the sets of operations 700 and 800, apparatus 900 and 1000, and methods 1200 and 1300, resolve features extracted from digitized H&E stained images at a higher order or higher level than a human can resolve in the human mind or with pencil and paper. For example, the spatial TIL features are not biological properties of cancerous tissue that a human eye can perceive. A tumor does not include a set of cluster graphs or graph interplay features, and these features cannot be stored in a human mind or practically computed in the human mind from digital computer files. Embodiments described herein use a combined order of specific rules, elements, operations, or components that render information into a specific format that is then used and applied to create desired results more accurately, more consistently, and with greater reliability than existing approaches, thereby improving the performance of the computer or system with which embodiments are implemented.

Using a more appropriately modulated treatment may lead to less aggressive therapeutics being required for a patient or may lead to avoiding or delaying a biopsy, a resection, or other invasive procedure. When patients demonstrating early-stage NSCLC who are likely to respond to immunotherapy are more accurately distinguished from patients who are unlikely to respond to immunotherapy, patients most at risk may receive a higher proportion of scarce resources (e.g., therapeutics, physician time and attention, hospital beds) while those less likely to benefit from the treatment, or less in need, may be spared unnecessary treatment, which in turn spares unnecessary expenditures and resource consumption. Example operations, methods, apparatus, and other embodiments may thus have the additional technical effect of improving patient outcomes compared to existing approaches.

In one example, a method may be implemented as computer executable instructions. Thus, in one example, a computer-readable storage device may store computer executable instructions that if executed by a machine (e.g., computer, processor) cause the machine to perform methods or operations described or claimed herein including operations 700 or 800, methods 1200 or 1300, or any other methods or operations described herein. While executable instructions associated with the listed methods are described as being stored on a computer-readable storage device, it is to be appreciated that executable instructions associated with other example methods or operations described or claimed herein may also be stored on a computer-readable storage device. In different embodiments the example methods or operations described herein may be triggered in different ways. In one embodiment, a method or operation may be triggered manually by a user. In another example, a method or operation may be triggered automatically.

Figure 9:
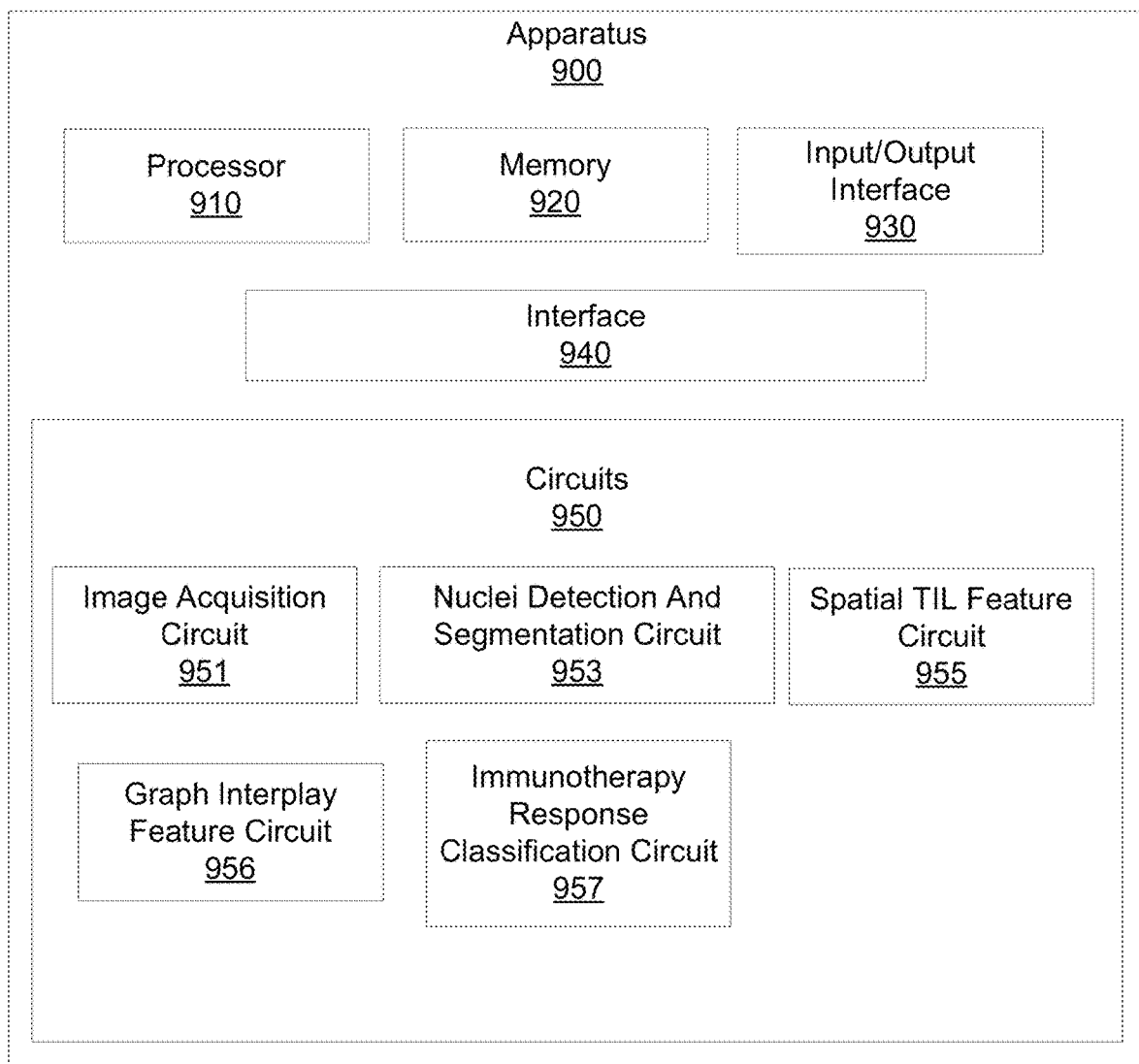
FIG. 9 illustrates an example apparatus for predicting response to immunotherapy.

FIG. 9 illustrates an example apparatus 900 for predicting response to immunotherapy in early-stage NSCLC. Apparatus 900 includes a processor 910.

Apparatus 900 also includes a memory 920. Processor 910 may, in one embodiment, include circuitry such as, but not limited to, one or more single-core or multi-core processors. Processor 910 may include any combination of general-purpose processors and dedicated processors (e.g., graphics processors, application processors, etc.). The processors may be coupled with or may include memory (e.g. memory 920) or storage and may be configured to execute instructions stored in the memory or storage to enable various apparatus, applications, or operating systems to perform the operations. Memory 920 is configured to store a digitized image of an H&E stained slide of a region of tissue demonstrating early-stage NSCLC. The digitized image has a plurality of pixels, a pixel having an intensity. Memory 920 may be further configured to store a training set or a testing set of digitized images of H&E stained slides of early-stage NSCLC.

Apparatus 900 also includes an input/output (I/O) interface 930, a set of circuits 950, and an interface 940 that connects the processor 910, the memory 920, the I/O interface 930, and the set of circuits 950. I/O interface 930 may be configured to transfer data between memory 920, processor 910, circuits 950, and external devices, for example, a CADx system or a personalized medicine system.

The set of circuits 950 includes an image acquisition circuit 951, a nuclei detection and segmentation circuit 953, a spatial TIL feature circuit 955, a graph interplay feature circuit 956, and an NSCLC immunotherapy response classification circuit 957.

Image acquisition circuit 951 is configured to access a diagnostic image of a region of tissue demonstrating early-stage NCSLS. The region of tissue represented in the diagnostic image includes a plurality of cellular nuclei. Accessing the diagnostic image may include accessing a digitized image of an H&E stained slide of a region of tissue demonstrating early-stage NSCLC stored in memory 920. Accessing the diagnostic image includes acquiring electronic data, reading from a computer file, receiving a computer file, reading from a computer memory, or other computerized activity that cannot practically be performed in the human mind.

Nuclei detection and segmentation circuit 953 is configured to detect a member of the plurality of cellular nuclei represented in the diagnostic image. Nuclei detection and segmentation circuit 953 is also configured to classify the member of the plurality of cellular nuclei represented in the diagnostic image as a TIL nucleus or as a non-TIL nucleus. In one embodiment, nuclei detecting and segmentation circuit 953 is configured to detect the member of the plurality of cellular nuclei represented in the diagnostic image using a watershed segmentation technique. The watershed segmentation technique includes applying, at a plurality of scales, a fast radial symmetry transform and regional minima to the diagnostic image. In one embodiment, the plurality of scales may include 5×, 10×, or 20× scales. In another embodiment, nuclei detecting and segmentation circuit 953 may be configured to employ other automated segmentation techniques.

Spatial TIL feature circuit 955 is configured to extract a set of spatial TIL features from the plurality of cellular nuclei represented in the diagnostic image. The set of spatial TIL features includes a first subset of features based on the spatial arrangement of TIL nuclei represented in the diagnostic image. The set of spatial TIL features also includes a second subset of features based on the spatial relationship between TIL nuclei and non-TIL nuclei represented in the diagnostic image.

In one embodiment, spatial TIL feature circuit 955 is configured to generate the first subset of features by generating at least one TIL cluster graph. A node of a TIL cluster graph is a centroid of a TIL-nucleus. The probability that a first centroid of a first TIL-nucleus will be connected with a second, different centroid of a second, different TIL-nucleus is based on a weighted Euclidean norm of the Euclidean distance between the first centroid of the first TIL-nucleus and the second centroid of the second, different TIL-nucleus. In this embodiment, spatial TIL feature circuit 955 is further configured to compute a first set of spatial TIL features based on the TIL cluster graph.

In one embodiment, spatial TIL feature circuit 955 is configured to generate the second subset of features by generating a non-TIL cluster graph. A node of the non-TIL cluster graph is a centroid of a non-TIL nucleus. The probability that a first centroid of a first, non-TIL nucleus will be connected with a second, different centroid of a second, different non-TIL nucleus is based on a weighted Euclidean norm of the Euclidean distance between the first centroid of the first non-TIL nucleus and the second centroid of the second, different non-TIL nucleus. In this embodiment, spatial TIL feature circuit 955 is also configured to compute a second set of spatial TIL features based on the non-TIL cluster graph and the TIL cluster graph. The second set of spatial TIL features describes a statistical relationship between the non-TIL cluster graph and the TIL cluster graph.

Graph interplay circuit 956 is configured to compute a set of graph interplay features. The set of graph interplay features may, in one embodiment, be based on the set of spatial TIL features. The set of graph interplay features may include, in one embodiment, a weighted efficiency between two graphs feature; a similarity between two graphs feature; a nodes closeness ratio; a mean number of lymphocyte clusters in a cancer cluster feature; and a difference of characteristic path length between two graphs feature. In another embodiment, the set of graph interplay features may include other, different graph interplay features.

Immunotherapy response classification circuit 957 is configured to compute a probability that region of tissue will respond to immunotherapy. Immunotherapy response classification circuit 957 computes the probability based, at least in part, on the set of graph interplay features. Immunotherapy response classification circuit 957 is also configured to generate a classification of the region of tissue as likely to respond to immunotherapy or unlikely to respond to immunotherapy based, at least in part, on the probability. Immunotherapy response classification circuit 957 is configured to compute a probability that region of tissue will respond to immunotherapy including but not limited to Nivolumab, pembrolizumab, atezolizumab, or other type of immunotherapy agent.

In one embodiment, immunotherapy response classification circuit 957 includes a machine learning classifier configured to compute the probability based, at least in part, on the set of graph interplay features. The machine learning classifier may employ a random forest classification approach. In this embodiment, the machine learning classifier is trained on a set of training images. In one embodiment, a member of the set of training images is acquired using different imaging parameters than the diagnostic image. In another embodiment, immunotherapy response classification circuit 957 may be configured as another type of machine learning or deep learning classifier, including as an LDA classifier, a QDA classifier, or a CNN classifier.

Figure 10:
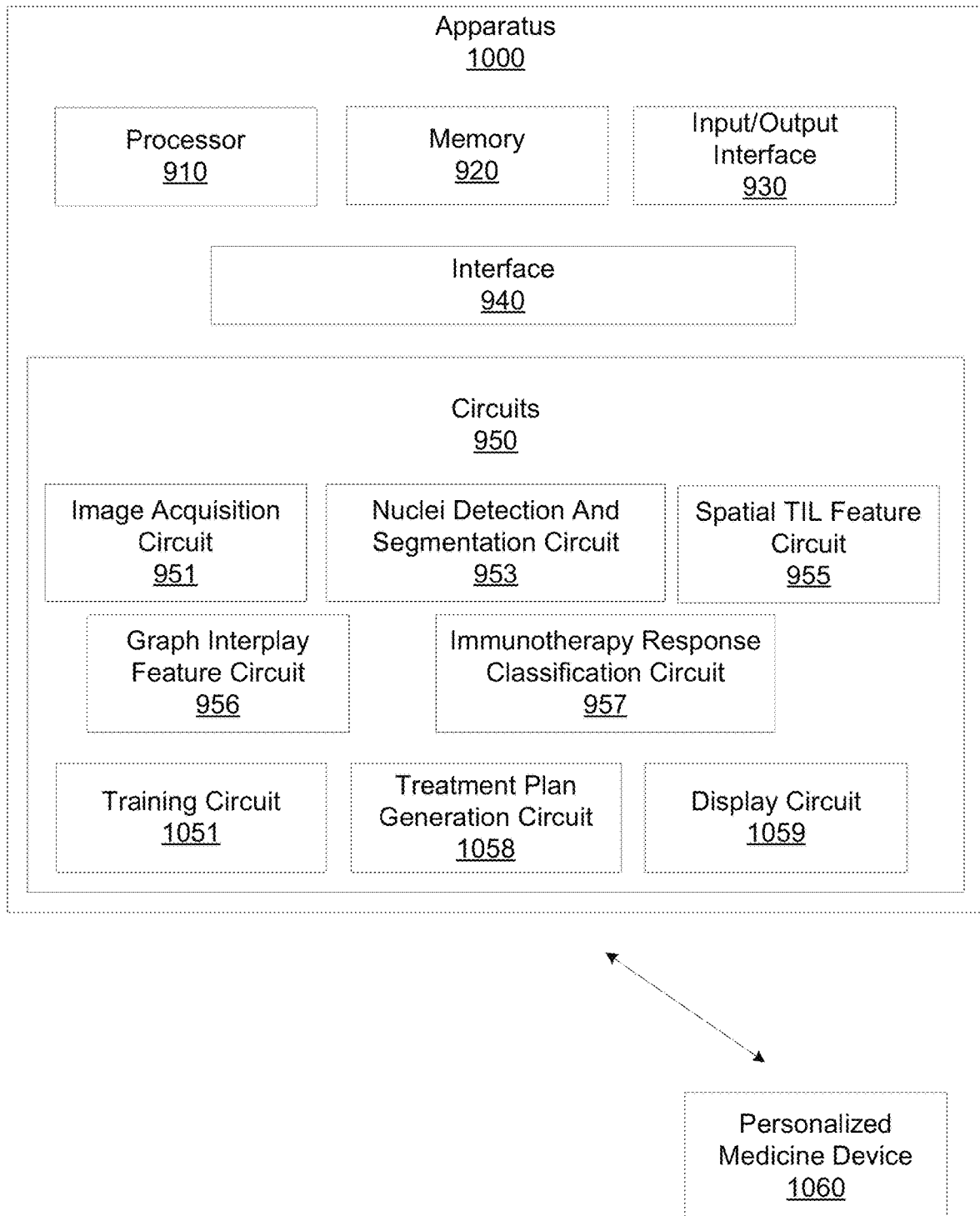
FIG. 10 illustrates an example apparatus for predicting response to immunotherapy.

FIG. 10 illustrates an apparatus 1000 that is similar to apparatus 900 but that includes additional elements and details. Apparatus 1000 includes a treatment plan generation circuit 1058. Treatment plan generation circuit 1058 is configured to generate a personalized treatment plan based, at least in part, on the classification. In one embodiment, the personalized treatment plan is further based on the diagnostic image, the graph interplay features, or the set of spatial TIL features. The personalized treatment plan may suggest a surgical treatment, may define an immunotherapy agent dosage or schedule, or a chemotherapy agent dosage or schedule, when the region of tissue is classified as likely to respond to immunotherapy. For a region of tissue classified as unlikely to respond to immunotherapy, other treatments, schedules, or dosages may be suggested.

Apparatus 1000 also includes a display circuit 1059. Display circuit 1059 is configured to display the classification, the probability, the personalized treatment plan, the set of graph interplay features, the set of spatial TIL features, or the diagnostic image. In one embodiment, display circuit 1059 is configured to display the classification, the probability, the personalized treatment plan, the set of graph interplay features, the set of spatial TIL features, or the diagnostic image on a computer monitor, a smartphone display, a tablet display, or other displays. Displaying the classification, the probability, the personalized treatment plan, the set of graph interplay features, the set of spatial TIL features, or the diagnostic image may also include printing the classification, the probability, the personalized treatment plan, the set of graph interplay features, the set of spatial TIL features, or the diagnostic image. Display circuit 1059 may also control a CADx system, a monitor, or other display, to display operating parameters or characteristics of image acquisition circuit 951, nuclei detecting and segmentation circuit 953, spatial TIL feature circuit 955, graph interplay feature circuit 956, or immunotherapy response classification circuit 557, including a machine learning classifier, during both training and testing, or during clinical operation of apparatus 900 or apparatus 1000.

In one embodiment, apparatus 1000 also includes training circuit 1051. Training circuit 1051 is configured to train immunotherapy response classification circuit 957 according to techniques described herein. Training immunotherapy response classification circuit 957 may include training a machine learning classifier, including a random forest classifier or a QDA classifier. In one embodiment, training circuit 1051 is configured to access a training dataset of digitized images of a region of interest demonstrating early-stage NSCLC. The training dataset includes images of tissue that responded to immunotherapy, and different images of tissue that did not respond to immunotherapy. Training circuit 1051 may be further configured to access a testing dataset of digitized images of a region of interest demonstrating early-stage NSCLC, where the testing dataset includes images of tissue that responded to immunotherapy, and different images of tissue that did not respond to immunotherapy, including but not limited to Nivolumab, pembrolizumab, atezolizumab, or other type of immunotherapy agent. In this embodiment, the machine learning classifier is trained and tested using the training dataset of images and the testing dataset of images. Training the machine learning classifier may include training the machine learning classifier until a threshold level of accuracy is achieved, until a threshold time has been spent training the machine learning classifier, until a threshold amount of computational resources have been expended training the machine learning classifier, or until a user terminates training. Other training termination conditions may be employed.

FIG. 10 further illustrates a personalized medicine device 1060. Apparatus 1000 may be configured to transmit the classification, the probability, the personalized treatment plan, the set of graph interplay features, the set of spatial TIL features, or the diagnostic image to the personalized medicine device 1060. Personalized medicine device 1060 may be, for example, a CADx system, an early-stage NSCLC immunotherapy response prediction system, or other type of personalized medicine device that may be used to facilitate the classification of tissue or the prediction of response to immunotherapy. In one embodiment, treatment plan generation circuit 1058 may control personalized medicine device 1060 to display the classification, the probability, the personalized treatment plan, the set of graph interplay features, the set of spatial TIL features, or the diagnostic image on a computer monitor, a smartphone display, a tablet display, or other displays.

Figure 11:
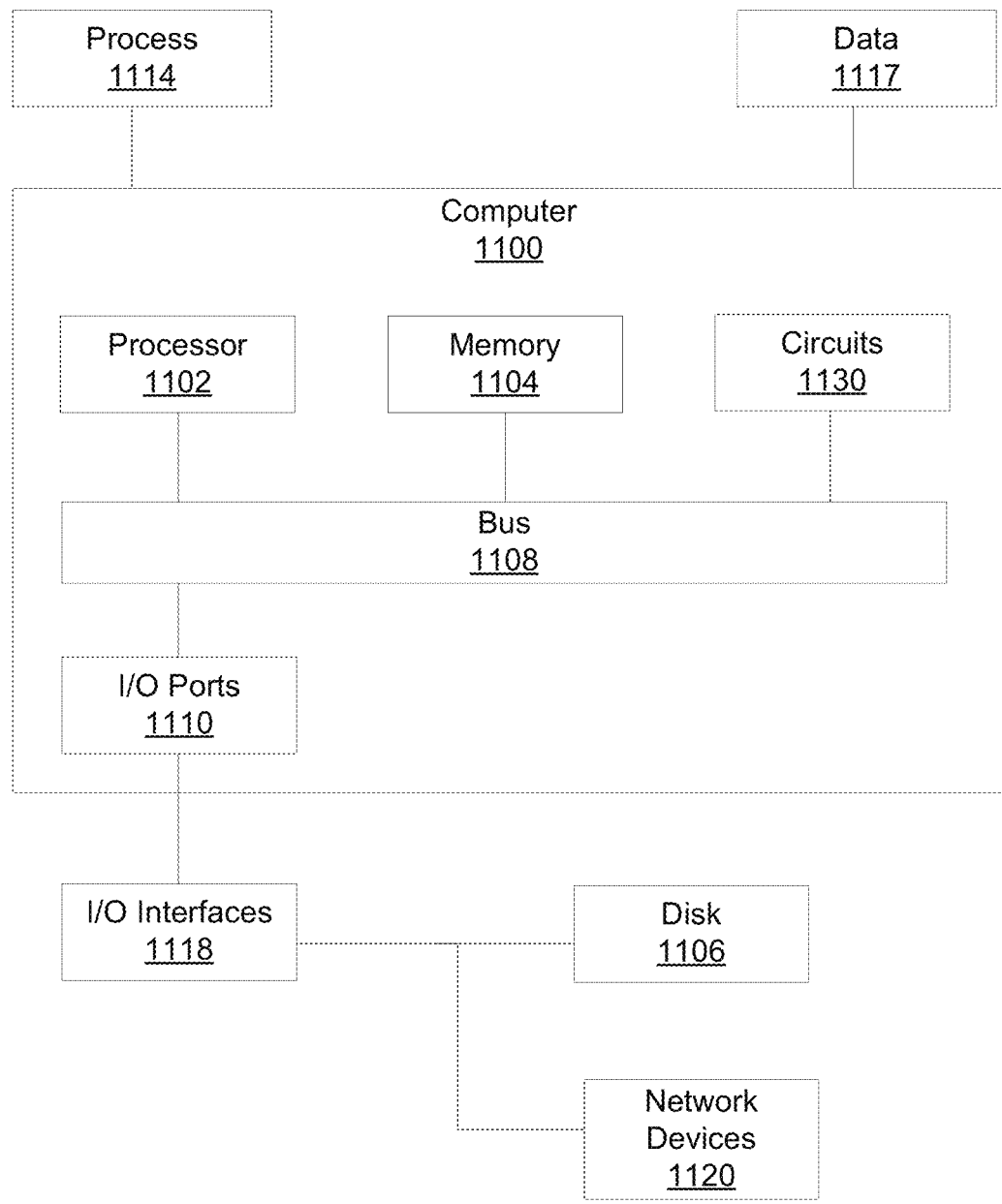
FIG. 11 illustrates an example computer in which embodiments described herein may operate.

FIG. 11 illustrates an example computer 1100 in which example methods illustrated herein can operate and in which example methods, apparatus, circuits, operations, or logics may be implemented. In different examples, computer 1100 may be part of immunotherapy response prediction system or apparatus, a digital whole slide scanner, may be operably connectable to immunotherapy response prediction system or apparatus, or a digital whole slide scanner.

Computer 1100 includes a processor 1102, a memory 1104, and input/output (I/O) ports 1110 operably connected by a bus 1108. In one example, computer 1100 may include a set of logics or circuits 1130 that perform operations for or a method of predicting response to immunotherapy in NSCLC using a machine learning classifier. Thus, the set of circuits 1130, whether implemented in computer 1100 as hardware, firmware, software, and/or a combination thereof may provide means (e.g., hardware, firmware, circuits) for predicting response to immunotherapy in NSCLC. In different examples, the set of circuits 1130 may be permanently and/or removably attached to computer 1100.

Processor 1102 can be a variety of various processors including dual microprocessor and other multi-processor architectures. Processor 1102 may be configured to perform operations or steps of methods claimed and described herein. Memory 1104 can include volatile memory and/or non-volatile memory. A disk 1106 may be operably connected to computer 1100 via, for example, an input/output interface (e.g., card, device) 1118 and an input/output port 1110. Disk 1106 may include, but is not limited to, devices like a magnetic disk drive, a tape drive, a Zip drive, a flash memory card, or a memory stick. Furthermore, disk 1106 may include optical drives like a CD-ROM or a digital video ROM drive (DVD ROM). Memory 1104 can store processes 1114 or data 1117, for example. Data 1117 may, in one embodiment, include digitized pathology slides. Disk 1106 or memory 1104 can store an operating system that controls and allocates resources of computer 1100.

Bus 1108 can be a single internal bus interconnect architecture or other bus or mesh architectures. While a single bus is illustrated, it is to be appreciated that computer 1100 may communicate with various devices, circuits, logics, and peripherals using other buses that are not illustrated (e.g., PCIE, SATA, Infiniband, 794, USB, Ethernet).

Computer 1100 may interact with input/output devices via I/O interfaces 1118 and input/output ports 1110. Input/output devices can include, but are not limited to, CT systems, MRI systems, digital whole slide scanners, an optical microscope, a keyboard, a microphone, a pointing and selection device, cameras, video cards, displays, disk 1106, network devices 1120, or other devices. Input/output ports 1110 can include but are not limited to, serial ports, parallel ports, or USB ports.

Computer 1100 may operate in a network environment and thus may be connected to network devices 1120 via I/O interfaces 1118 or I/O ports 1110. Through the network devices 1120, computer 1100 may interact with a network. Through the network, computer 1100 may be logically connected to remote computers. The networks with which computer 1100 may interact include, but are not limited to, a local area network (LAN), a wide area network (WAN), or other networks, including the cloud.

Figure 12:
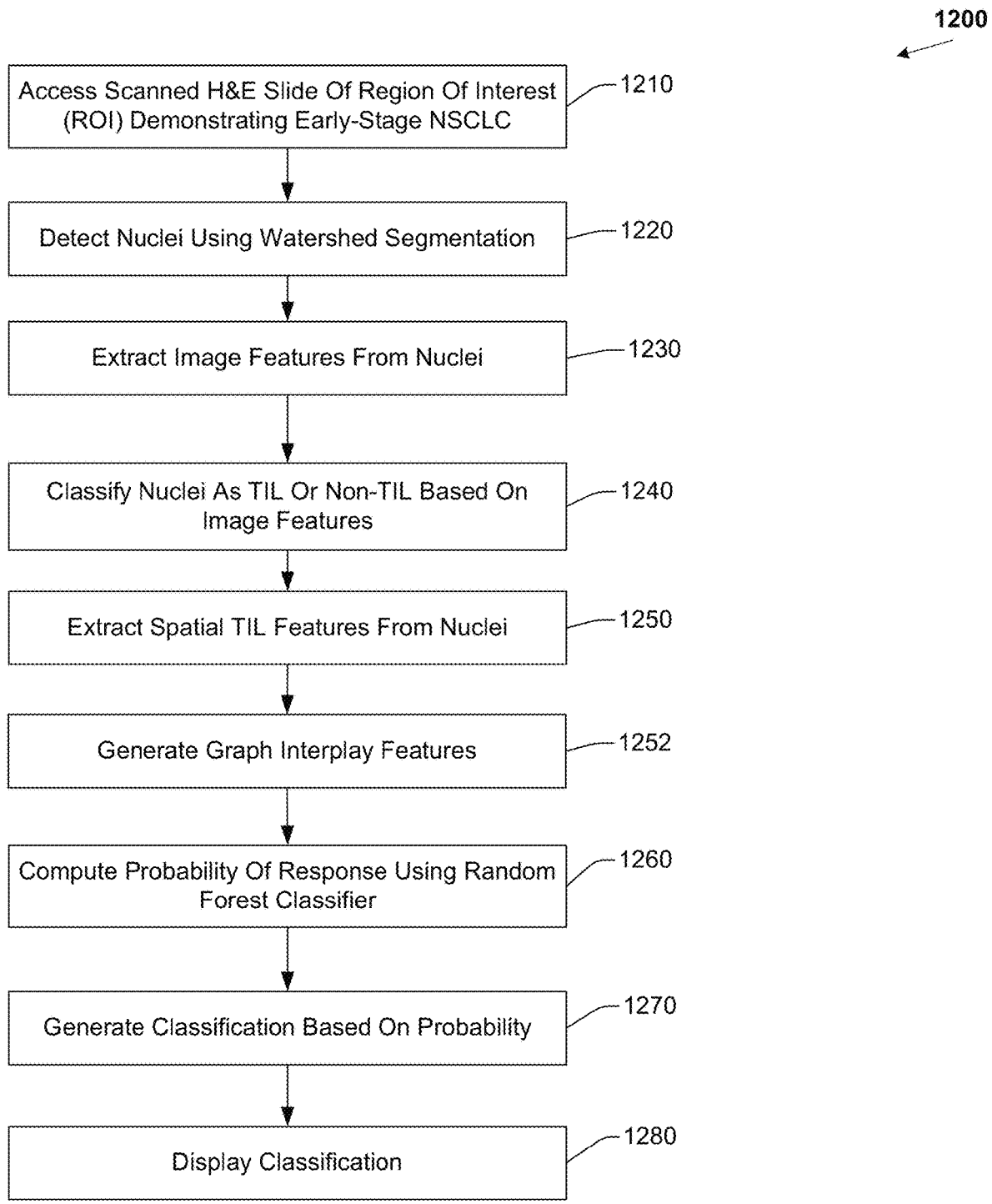
FIG. 12 illustrates an example method for predicting response to immunotherapy.

FIG. 12 illustrates an example method 1200. Method 1200 includes, at 1210 accessing a digitized image of a region of tissue demonstrating NSCLC. The image has a plurality of pixels, a pixel having an intensity. Accessing the digitized image includes acquiring electronic data, reading from a computer file, receiving a computer file, reading from a computer memory, or other computerized activity that cannot be practically performed in the human mind. In one embodiment, the digitized image is a scanned image of an H&E stained slide of a region of tissue demonstrating early stage NSCLC, where the region of tissue includes a plurality of cellular nuclei, where the scanned image is acquired using a first set of imaging parameters. In one embodiment, the digitized image is a 1500 pixel by 1500 pixel digitized H&E stained image scanned at 20× magnification. In another embodiment, the image is a 2000 pixel by 2000 pixel digitized H&E stained image scanned at 30× magnification. In another embodiment, other stain types, magnifications, or dimensions may be employed.

Method 1200 also includes, at 1220 detecting, using a watershed segmentation technique, a member of the plurality of cellular nuclei represented in the scanned image. Detecting, using a watershed segmentation technique, a member of the plurality of cellular nuclei includes acquiring electronic data, reading from a computer file, receiving a computer file, reading from a computer memory, or other computerized activity that cannot be practically performed in the human mind.

Method 1200 also includes, at 1230, extracting a set of image features from the member of the plurality of cellular nuclei. Extracting the set of image features includes acquiring electronic data, reading from a computer file, receiving a computer file, reading from a computer memory, or other computerized activity that cannot be practically performed in the human mind.

Method 1200 also includes, at 1240, classifying the member of the plurality of cellular nuclei as a tumor infiltrating lymphocyte (TIL) nucleus or non-TIL nucleus based, at least in part, on the set of image features. Classifying the member of the plurality of cellular nuclei as a TIL nucleus or non-TIL nucleus may include providing the set of image features to a machine learning classifier trained to distinguish TIL nuclei from non-TIL nuclei. Classifying the member of the plurality of cellular nuclei includes acquiring electronic data, reading from a computer file, receiving a computer file, reading from a computer memory, or other computerized activity that cannot be practically performed in the human mind.

Method 1200 also includes, at 1250, extracting a set of spatial TIL features from the plurality of cellular nuclei, where the set of spatial TIL features includes a first subset of features based on the spatial arrangement of TIL nuclei represented in the scanned image, and a second subset of features based on the spatial relationship between TIL nuclei and non-TIL nuclei represented in the scanned image.

Extracting the set of spatial TIL features includes acquiring electronic data, reading from a computer file, receiving a computer file, reading from a computer memory, or other computerized activity that cannot be practically performed in the human mind.

Method 1200 also includes, at 1252, generating a set of graph interplay features based on the set of spatial TIL features. The set of graph interplay features includes a weighted efficiency between two graphs feature, a similarity between two graphs feature, a nodes closeness ratio, a mean number of lymphocyte clusters in a cancer cluster feature, and a difference of characteristic path length between two graphs feature. Generating the set of graph interplay features includes acquiring electronic data, reading from a computer file, receiving a computer file, reading from a computer memory, or other computerized activity that cannot be practically performed in the human mind.

Method 1200 also includes, at 1260, computing, using a random forest classifier, a probability that the region of tissue will respond to immunotherapy. Immunotherapy may, in one embodiment, include Nivolumab, pembrolizumab, atezolizumab, or other type of immunotherapy agent. The random forest classifier computes the probability based, at least in part, on the set of graph interplay features. The random forest classifier is trained on a training data set of scanned images of H&E stained slides of a region of tissue demonstrating early stage NSCLC, where at least one member of the training data set is acquired using a second, different set of imaging parameters. In another embodiment, other types of machine learning classifiers or deep learning classifiers may be employed, including a QDA classifier, a SVM classifier, or a CNN classifier. Computing, using a random forest classifier, the probability, includes acquiring electronic data, reading from a computer file, receiving a computer file, reading from a computer memory, or other computerized activity that cannot be practically performed in the human mind.

Method 1200 also includes, at 1270, generating a classification of the region of tissue as likely to respond to immunotherapy or unlikely to respond to immunotherapy based, at least in part, on the probability. Generating the classification includes acquiring electronic data, reading from a computer file, receiving a computer file, reading from a computer memory, or other computerized activity that cannot be practically performed in the human mind.

Method 1200 further includes, at 1280, displaying the classification and at least one of the probability, the digitized image, or the set of graph interplay features. Displaying the classification and at least one of the probability, the digitized image, or the set of graph interplay features may include displaying the classification and at least one of the probability, the digitized image, or the set of graph interplay features on a computer monitor, a smartphone display, a tablet display, or other displays. Displaying the classification and at least one of the probability, the digitized image, or the set of graph interplay features may include printing the classification and at least one of the probability, the digitized image, or the set of graph interplay features.

Examples herein can include subject matter such as an apparatus, an immunotherapy response prediction system, a personalized medicine system, a CADx system, a processor, a system, circuitry, a method, means for performing acts, steps, or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for predicting response to immunotherapy in NSCLC, according to embodiments and examples described.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Circuit", as used herein, includes but is not limited to hardware, firmware, software in execution on a machine, or combinations of each to perform a function(s) or an action(s), or to cause a function or action from another logic, method, or system. A circuit may include a software controlled microprocessor, a discrete logic (e.g., ASIC), an analog circuit, a digital circuit, a programmed logic device, a memory device containing instructions, and other physical devices. A circuit may include one or more gates, combinations of gates, or other circuit components. Where multiple logical circuits are described, it may be possible to incorporate the multiple logical circuits into one physical circuit. Similarly, where a single logical circuit is described, it may be possible to distribute that single logical circuit between multiple physical circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable storage device storing computer-executable instructions that when executed control a processor to perform operations, the operations comprising:
    accessing a digitized image of a region of tissue demonstrating early-stage non-small cell lung cancer (NSCLC), where the region of tissue includes a plurality of cellular nuclei;
    detecting a member of the plurality of cellular nuclei represented in the digitized image;
    classifying the member of the plurality of cellular nuclei as a tumor infiltrating lymphocyte (TIL) nucleus or non-TIL nucleus;
    extracting a set of spatial TIL features from the plurality of cellular nuclei, where the set of spatial TIL features includes a first subset of features based on the spatial arrangement of TIL nuclei represented in the digitized image, and a second, different subset of features based on the spatial relationship between TIL nuclei and non-TIL nuclei represented in the digitized image;
    generating a set of graph interplay features based on the set of spatial TIL features;
    providing the set of graph interplay features to a machine learning classifier;
    receiving, from the machine learning classifier, a probability that the region of tissue will respond to immunotherapy, where the machine learning classifier computes the probability based, at least in part, on the set of spatial TIL features;
    classifying the region of tissue as likely to respond to immunotherapy or unlikely to respond to immunotherapy based, at least in part, on the probability; and
    displaying the classification.

2. The non-transitory computer-readable storage device of claim 1, the operations further comprising:
    generating the first subset of features, where generating the first subset of features includes:
        generating a TIL cluster graph, where a node of the TIL cluster graph is a centroid of a TIL-nucleus, where the probability that a first centroid of a first TIL-nucleus will be connected with a second, different centroid of a second, different TIL nucleus is based on a weighted Euclidean norm of the Euclidean distance between the first centroid and the second centroid; and
        computing a first set of spatial TIL features based on the TIL cluster graph.

3. The non-transitory computer-readable storage device of claim 2, where the first set of spatial TIL features includes:
    the mean of the number of TILs in the TIL cluster graph, the mean of the ratio of the area of the TIL cluster graph and the area of the region of tissue represented in the image, and the mean of the ratio of the number of TILs within the TIL cluster graph and the area of the TIL cluster graph;
    the mode of the number of TILs in the TIL cluster graph, the mode of the ratio of the area of the TIL cluster graph and the area of the region of tissue represented in the image, and the mode of the ratio of the number of TILs within the TIL cluster graph and the area of the TIL cluster graph; and
    the median of the number of TILs in the TIL cluster graph, the median of the ratio of the area of the TIL cluster graph and the area of the region of tissue represented in the image, and the median of the ratio of the number of TILs within the TIL cluster graph and the area of the TIL cluster graph.

4. The non-transitory computer-readable storage device of claim 2, the operations further comprising:
    generating the second subset of features, where generating the second subset of features includes:
        generating a non-TIL cluster graph where a node of the non-TIL cluster graph is a centroid of a non-TIL-nucleus, where the probability that a first centroid of a first non-TIL nucleus will be connected with a second, different centroid of a second, different non-TIL nucleus is based on a weighted Euclidean norm of the Euclidean distance between the first non-TIL centroid and the second, different non-TIL centroid; and
        computing a second set of spatial TIL features based on the non-TIL cluster graph and the TIL cluster graph, where the second set of spatial TIL features describes a statistical relationship between the non-TIL cluster graph and the TIL cluster graph.

5. The non-transitory computer-readable storage device of claim 4, where the second set of spatial TIL features includes:
    a ratio between the density of a non-TIL cluster graph and the density of the TIL cluster graph nearest the non-TIL cluster graph;
    the value of an intersecting area of a non-TIL cluster graph and a TIL cluster graph; and
    a value indicating if the nearest neighbor cluster graph of a TIL cluster graph is a non-TIL cluster graph or a TIL cluster graph.

6. The non-transitory computer-readable storage device of claim 1, where the machine learning classifier is a random forest classifier.

7. The non-transitory computer-readable storage device of claim 6, where the set of graph interplay features includes:
    a weighted efficiency between two graphs feature;
    a similarity between two graphs feature;
    a nodes closeness ratio;
    a mean number of lymphocyte clusters in a cancer cluster feature; and
    a difference of characteristic path length between two graphs feature.

8. The non-transitory computer-readable storage device of claim 1, where the machine learning classifier is a quadratic discriminant analysis (QDA) classifier.

9. The non-transitory computer-readable storage device of claim 8 where the set of graph interplay features includes:
    an area of TIL clusters feature;
    a spatial proximity of TILs feature;
    a spatial proximity of TILs to non-TIL feature; and
    a density of clusters feature.

10. The non-transitory computer-readable storage device of claim 1, where detecting a member of the plurality of cellular nuclei represented in the digitized image includes detecting the member of the plurality of cellular nuclei represented in the digitized image using a watershed segmentation technique, where the watershed segmentation technique includes applying, at a plurality of scales, a fast radial symmetry transform and regional minima to the digitized image.

11. The non-transitory computer-readable storage device of claim 1, where classifying the member of the plurality of cellular nuclei as a TIL nucleus or non-TIL nucleus comprises:
extracting a set of image features from the member of the plurality of cellular nuclei, where the set of image features includes a texture feature, a shape feature, and a color feature;
providing the set of image features to a second, different, machine learning classifier;
receiving, from the second machine learning classifier, a classification of the member of the plurality of cellular nuclei as a TIL nucleus or non-TIL nucleus, where the second machine learning classifier classifies the member of the plurality of cellular nuclei based on the set of image features.

12. The non-transitory computer-readable storage device of claim 1, where the digitized image is a 1500 pixel by 1500 pixel digitized hematoxylin and eosin (H&E) stained image scanned at 20× magnification.

13. The non-transitory computer-readable storage device of claim 1, the operations further comprising displaying the classification and at least one of the digitized image, the probability, the first subset of features, the second subset of features, or the set of graph interplay features.

14. An apparatus for predicting response to immunotherapy in early-stage non-small cell lung cancer (NSCLC), comprising:
a processor;
a memory configured to store a digitized image of a hematoxylin and eosin (H&E) stained image of a region of tissue demonstrating early stage NSCLC;
an input/output (I/O) interface;
a set of circuits; and
an interface that connects the processor, the memory, the I/O interface, and the set of circuits, the set of circuits comprising:
an image acquisition circuit configured to access a diagnostic image of a region of tissue demonstrating early-stage NSCLC, where the region of tissue includes a plurality of cellular nuclei;
a nuclei detecting and segmentation circuit configured to:
detect a member of the plurality of cellular nuclei represented in the diagnostic image; and
classify the member of the plurality of cellular nuclei as a tumor infiltrating lymphocyte (TIL) nucleus or non-TIL nucleus;
a spatial TIL feature circuit configured to:
extract a set of spatial TIL features from the plurality of cellular nuclei represented in the diagnostic image, where the set of spatial TIL features includes a first subset of features based on the spatial arrangement of TIL nuclei represented in the diagnostic image, and extract a second subset of features based on the spatial relationship between TIL nuclei and non-TIL nuclei represented in the diagnostic image;
a graph interplay circuit configured to compute a set of graph interplay features based on the set of spatial TIL features;
an immunotherapy response classification circuit configured to:
compute a probability that region of tissue will respond to immunotherapy, based, at least in part, on the set of graph interplay features; and
generate a classification of the region of tissue as likely to respond to immunotherapy, or unlikely to respond to immunotherapy, based, at least in part, on the probability; and
a display circuit configured to display the classification and at least one of the probability, the diagnostic image, the set of spatial TIL features, or the set of graph interplay features.

15. The apparatus of claim 14, where the nuclei detecting and segmentation circuit is configured to detect the member of the plurality of cellular nuclei represented in the diagnostic image using a watershed segmentation technique, where the watershed segmentation technique includes applying, at a plurality of scales, a fast radial symmetry transform and regional minima to the diagnostic image.

16. The apparatus of claim 14, where the spatial TIL feature circuit is further configured to generate the first subset of features by:
generating a TIL cluster graph, where a node of the TIL cluster graph is a centroid of a TIL-nucleus, where the probability that a first centroid of a first TIL-nucleus will be connected with a second, different centroid of a second, different TIL-nucleus is based on a weighted Euclidean norm of the Euclidean distance between the first centroid of the first TIL-nucleus and the second centroid of the second, different TIL-nucleus; and
computing a first set of spatial TIL features based on the TIL cluster graph.

17. The apparatus of claim 16, where the spatial TIL feature circuit is further configured to generate the second subset of features by:
generating a non-TIL cluster graph, where a node of the non-TIL cluster graph is a centroid of a non-TIL nucleus, where the probability that a first centroid of a first, non-TIL nucleus will be connected with a second, different centroid of a second, different non-TIL nucleus is based on a weighted Euclidean norm of the Euclidean distance between the first centroid of the first non-TIL nucleus and the second centroid of the second, different non-TIL nucleus; and
computing a second set of spatial TIL features based on the non-TIL cluster graph and the TIL cluster graph, where the second set of spatial TIL features describes a statistical relationship between the non-TIL cluster graph and the TIL cluster graph.

18. The apparatus of claim 14, where the immunotherapy response classification circuit is configured to compute the probability that the region of tissue will respond to immunotherapy using a random forest classifier trained on a set of training images, where a member of the set of training images is acquired using different imaging parameters than the diagnostic image.

19. The apparatus of claim 14, where the set of graph interplay features includes:
a weighted efficiency between two graphs feature;
a similarity between two graphs feature;
a nodes closeness ratio;
a mean number of lymphocyte clusters in a cancer cluster feature; and
a difference of characteristic path length between two graphs feature.

20. A non-transitory computer readable storage device storing computer-executable instructions that when executed by a computer control the computer to perform a method for predicting response to immunotherapy in early-stage non-small cell lung cancer (NSCLC), the method comprising:

accessing a scanned image of a hematoxylin and eosin (H&E) stained slide of a region of tissue demonstrating early stage NSCLC, where the region of tissue includes a plurality of cellular nuclei, where the scanned image is acquired using a first set of imaging parameters;

detecting, using a watershed segmentation technique, a member of the plurality of cellular nuclei represented in the scanned image;

extracting a set of image features from the member of the plurality of cellular nuclei;

classifying the member of the plurality of cellular nuclei as a tumor infiltrating lymphocyte (TIL) nucleus or non-TIL nucleus based, at least in part, on the set of image features;

extracting a set of spatial TIL features from the plurality of cellular nuclei, where the set of spatial TIL features includes a first subset of features based on the spatial arrangement of TIL nuclei represented in the scanned image, and a second subset of features based on the spatial relationship between TIL nuclei and non-TIL nuclei represented in the scanned image;

generating a set of graph interplay features based on the set of spatial TIL features, where the set of graph interplay features includes a weighted efficiency between two graphs feature, a similarity between two graphs feature, a nodes closeness ratio, a mean number of lymphocyte clusters in a cancer cluster feature, and a difference of characteristic path length between two graphs feature;

computing, using a random forest classifier, a probability that the region of tissue will respond to immunotherapy, where the random forest classifier computes the probability based, at least in part, on the set of graph interplay features, where the random forest classifier is trained on a training data set of scanned images of H&E stained slides of a region of tissue demonstrating early stage NSCLC, where at least one member of the training data set is acquired using a second, different set of imaging parameters;

generating a classification of the region of tissue as likely to respond to immunotherapy or unlikely to respond to immunotherapy based, at least in part, on the probability; and displaying the classification and at least one of the probability, the scanned image, or the set of graph interplay features.

* * * * *

UNITED STATES PATENT AND TRADEMARK OFFICE
CERTIFICATE OF CORRECTION

PATENT NO. : 10,902,256 B2
APPLICATION NO. : 16/277021
DATED : January 26, 2021
INVENTOR(S) : Anant Madabhushi et al.

Page 1 of 1

It is certified that error appears in the above-identified patent and that said Letters Patent is hereby corrected as shown below:

In the Specification

Column 1, Lines 17 through 23; please replace "This invention was made with government support under grants 1U24CA199374-01, R01CA202752-01A1, R01CA208236-01A1, R01CA216579-01A1, and R01CA220581-01A1, awarded by the National Institutes of Health. Also grants C06RR12463-01, and W81XWH-16-1-0329, awarded by the Department of Defense. The government has certain rights in the invention." with --This invention was made with government support under grant(s) CA199374, CA202752, CA208236, CA216579, CA220581, and RR012463, awarded by the National Institutes of Health; and grant(s) W81XWH-16-1-0329, awarded by the Department of Defense. The government has certain rights in the invention.--

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*